(12) United States Patent
Dvir et al.

(10) Patent No.: US 8,117,383 B2
(45) Date of Patent: Feb. 14, 2012

(54) HARDWARE ACCELERATOR BASED METHOD AND DEVICE FOR STRING SEARCHING

(75) Inventors: Moti Dvir, Kiryat Ono (IL); Evgeni Ginzburg, Petah Tikva (IL); Adi Katz, Ramat Gan (IL)

(73) Assignee: Freescale Semiconductor, Inc., Austin, TX (US)

( * ) Notice: Subject to any disclaimer, the term of this patent is extended or adjusted under 35 U.S.C. 154(b) by 700 days.

(21) Appl. No.: 12/161,519

(22) PCT Filed: Jan. 18, 2006

(86) PCT No.: PCT/IB2006/050191
§ 371 (c)(1),
(2), (4) Date: Jul. 18, 2008

(87) PCT Pub. No.: WO2007/083198
PCT Pub. Date: Jul. 26, 2007

(65) Prior Publication Data
US 2008/0281778 A1    Nov. 13, 2008

(51) Int. Cl.
*G06F 12/00* (2006.01)
(52) U.S. Cl. ............... 711/108; 711/103; 711/E12.001
(58) Field of Classification Search .............. 711/108, 711/103, E12.001; 365/222, 191, 189.08, 365/230.06, 235
See application file for complete search history.

(56) References Cited

U.S. PATENT DOCUMENTS

| 5,860,085 | A | 1/1999 | Stormon et al. |
| 6,148,393 | A * | 11/2000 | Tran et al. ................. 712/213 |
| 6,992,943 | B2 * | 1/2006 | Hwang et al. ............... 365/222 |
| 7,050,317 | B1 * | 5/2006 | Lien et al. ..................... 365/49.1 |
| 7,170,891 | B2 * | 1/2007 | Messenger ..................... 370/392 |
| 2004/0139276 | A1 | 7/2004 | Srinivasan et al. |

FOREIGN PATENT DOCUMENTS

JP        05181642 A  *  7/1993

OTHER PUBLICATIONS

Huang et al; "A fast IP routing lookup scheme for gigabit switching routers"; IEEE 18th Annual Joint Conference of the IEEE Computer and Communications Societies, NY, USA, pp. 1429-1436.
Nourani et al; "Reconfigurable memory architecture for scalable IP forwarding engines"; Microprocessors and Microsystems, 2003, Great Britain, pp. 253-263.
Neil; "CMOS VLSI Design, third Edition"; 2005, Pearson Education, inc., USA, pp. 681-682.
Huang, Nen-Fu, et al., "A Fast IP Routing Lookup Scheme for Gigabit Switching Routers," IEEE 18th Annual Joint Conference of the IEEE Computer and Communications Societies, New York, USA, Mar. 21-25, 1999, pp. 1429-1436.

* cited by examiner

*Primary Examiner* — Pierre-Michel Bataille (57) ABSTRACT

A method for searching within a data block for a data chunk having a predefined value, the method includes: fetching, by a processor, a data block search instruction; fetching, a data unit that includes multiple data chunks; wherein at least one data chunk within the data unit belongs to the data block; deciding whether to use a mask for data chunk level masking; searching, by a hardware accelerator, for a valid data chunk within the fetched data unit that has the predefined value; wherein the searching comprising applying a mask; wherein a valid data chunk in an non-masked data chunk that belongs to the data block; and determining whether to update the value of the mask and whether to fetch a new data unit that belongs to the data block.

20 Claims, 6 Drawing Sheets

HARDWARE ACCELERATOR BASED METHOD AND DEVICE FOR STRING SEARCHING

CROSS REFERENCE TO RELATED APPLICATION

This application is based and claims benefits from PCT/IB06/50191, filed on Jan. 18, 2006, the contents of which are hereby incorporated herein by reference.

FIELD OF THE INVENTION

The present invention relates to a device and a method for searching within a data block for a data chunk having a predefined value.

BACKGROUND OF THE INVENTION

Modern processors are required to execute complex tasks at very high speeds. The introduction of pipelined processor architectures improved the performances of modern processors but also introduced some problems. In a pipelined architecture an execution of an instruction is split to multiple stages.

One of the most commonly used mathematical operations is finding a predefined value within an array of values. Typically, the search can be done by using an expensive CAM unit or by performing a time-consuming sequential search by a processor. CAM units can be purely associative or only partly associative, thus requiring an addition sequential search within one or more sub-arrays.

There is a need to provide an efficient device and a method for searching, within a data block, for a data chunk having a predefined value.

SUMMARY OF THE PRESENT INVENTION

A method and device for searching, within a data block, for a data chunk having a predefined value, as described in the accompanying claims.

BRIEF DESCRIPTION OF THE DRAWINGS

The present invention will be understood and appreciated more fully from the following detailed description taken in conjunction with the drawings in which.

DETAILED DESCRIPTION OF PREFERRED EMBODIMENTS

The following description refers to methods and systems for finding an predefined value within a data block.

A data block include multiple data chunks. The device and method are adapted to manage data blocks of different sizes as well as data chunks of different sizes.

A device and method for searching within a data block for a data chunk having a predefined value are provided. The method includes: (i) Fetching, by a processor, a data block search instruction and in response to the instruction requesting a hardware accelerator to perform a data block search operation. (ii) Fetching, a data unit that includes multiple data chunks. At least one data chunk within the data unit belongs to the data block. (iii) Deciding whether to use a mask to perform bit level masking or data chunk level masking. (iv) Searching, by a hardware accelerator, for a valid data chunk within the fetched data unit that has the predefined value. The searching includes applying a mask. A valid data chunk in an non-masked data chunk that belongs to the data block. (v) Determining whether to update the value of the mask and whether to fetch a new data unit that belongs to the data block.

The device includes: (i) a memory unit that is adapted to store data units, (ii) a processor that is adapted to fetch an instruction and selectively generate control signals in response to the fetched instruction, and (iii) a hardware accelerator, connected to the memory unit, wherein the hardware accelerator is adapted to: (a) receive control signals from the processor, (b) fetch a data unit that includes multiple data chunks; wherein at least one data chunk within the data unit belongs to the data block, (c) decide whether to use a mask to perform bit level masking or data chunk level masking; (d) search for a valid data chunk within the fetched data unit that has the predefined value; wherein the searching including applying a mask; wherein a valid data chunk in an non-masked data chunk that belongs to the data block; and (e) determine whether to update the value of the mask and whether to fetch a new data unit that belongs to the data block.

Device 10 uses a mask for performing bit level masking or data chunk level masking, thus it saves masking resources such as mask registers. It is noted that the bit level masking can be replaced by inter-data chunk masking. Thus, different portions of a data chunks can be masked, wherein these portions are larger than one bit.

Figure 1:
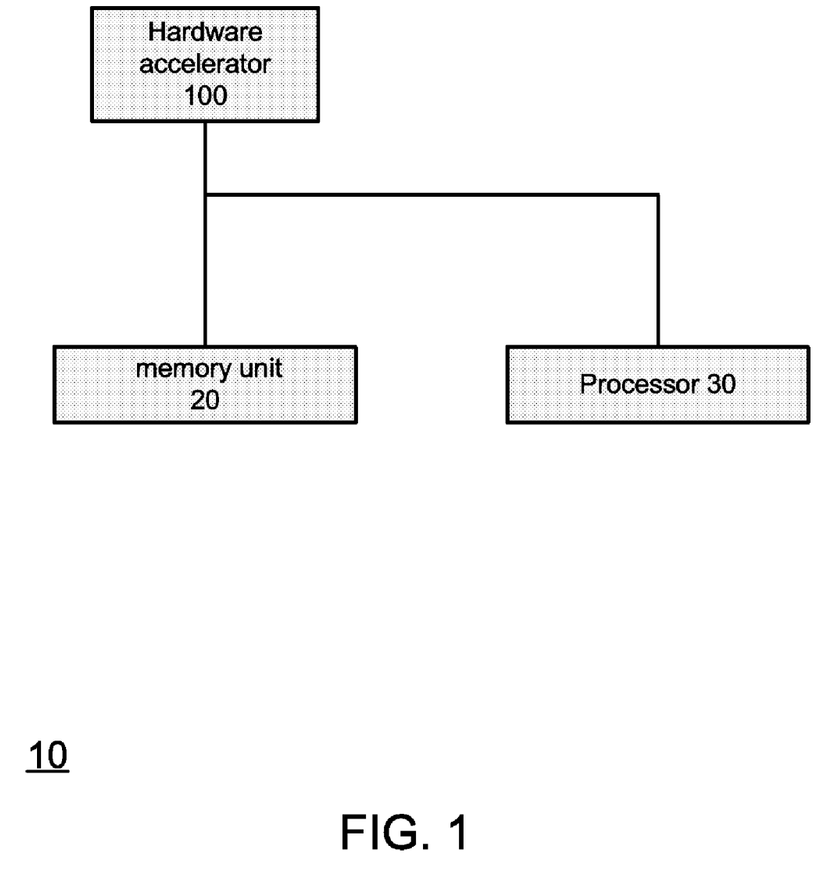
FIG. 1 is a schematic illustration of a device according to an embodiment of the invention.

FIG. 1 illustrates device 10, according to an embodiment of the invention. Device 10 can be an integrated circuit, multiple integrated circuits, a mobile phone, personal data accessory, media player, computer, and the like. Those of skill in the art will appreciate that device 10 can include many components and units that are not illustrated in FIG. 1, as well as include fewer components or other components than those that are illustrated in FIG. 1.

Device 10 includes a processor 30, a memory unit 20 and a hardware accelerator 100. They are connected to a single bus, although they can be connected to each other via additional or alternative components. The device 10 can include multiple processors, multiple memory units, one or more DMA controllers, cache memories, peripherals, interconnects and the like.

The hardware accelerator can receive an instruction from processor 20 and perform a search operation while the processor continues to process other instructions.

Conveniently, the processor 30 is a pipelined processor. It can include multiple pipelines stages. Conveniently, it includes a fetch unit, an issue unit, an execute unit and a write-back unit. Typically, ALU related instructions are executing in a four-processor cycles (fetch, decode, execute ALU operation and write-back), while load instructions are executed in four or five processor cycles.

Conveniently, the processor 30 may execute many instructions without being assisted by the hardware accelerator 100.

Nevertheless, some instructions such as BCAM instruction 200 or BCAMI instruction 220 (collectively referred to as search instructions) are executed mainly by the hardware accelerator 100.

The processor 20 and the hardware accelerator 100 can communicate in various manners. They can communicate by using various well-known communication schemes. These schemes can include handshaking, interrupts, and the like. Conveniently, the processor sends a BCAM instruction 200 or a BCAMI instruction 220 to the hardware processor 100. It can also send a modified instruction to the hardware accelerator 100, send only few fields of the instruction or otherwise send dedicated signals to the hardware accelerator 100 in order to initiate an predefined value search operation. The various signals or instructions are referred to as control signals.

Figure 3:
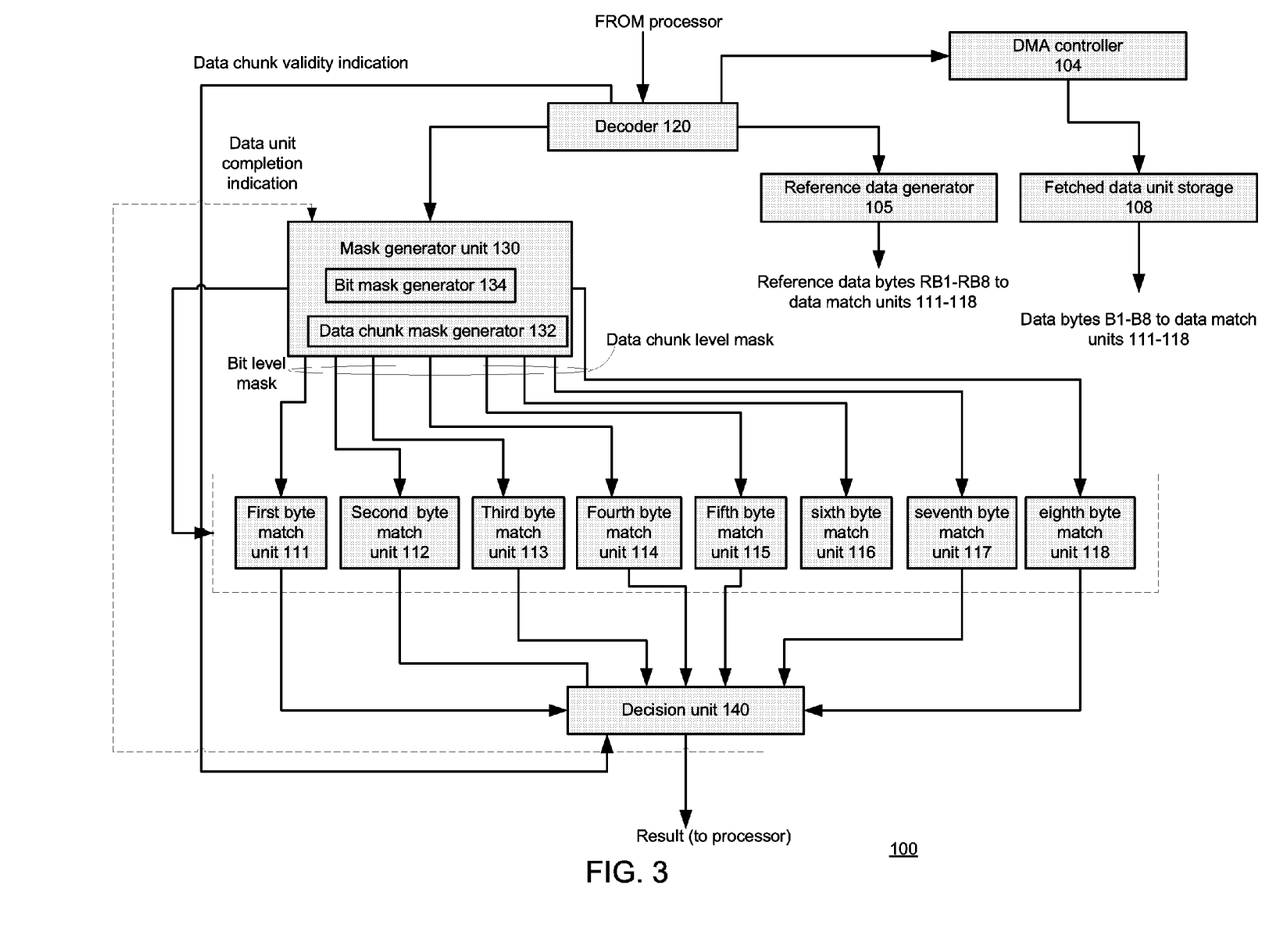
FIG. 3 a hardware accelerator, according to an embodiment of the invention.

The hardware accelerator 100 can have its own decoder, in order to decode hardware accelerator instructions (such as but not necessarily limited to the search instructions) it receives from processor 30. FIG. 3 illustrated such an internal decoder. That decoder 120 operates as a controller of the hardware accelerator.

The device 10 can search a data chunk that has a predefined value within a data block, whereas the data block size can differ from $2^x$. The device 10 can search for a matching data chunk within large data blocks, and especially data blocks that cannot be processed by the hardware accelerator 100 during a single search sequence. Data chunks that are fetched but do not belong to the data block are rendered disabled (or un-valid).

The hardware accelerator 100 can be adapted to search for data chunks of different sizes, within data blocks of different sizes, and are also able to mask data chunks.

Conveniently, the processor 30 fetches an instruction from memory unit 20 or from an instruction memory unit (not shown), which can be a non-volatile memory unit. Processor 30 then decodes the fetched instruction and if it is a predefined value instruction it sends control signals to the hardware accelerator and then it can continue to process other instructions that are in the pipeline.

The hardware accelerator (100) can receive the control signals from the processor 30, and perform the search operation while the processor 30 can execute other instructions.

It is noted that the search operation can be stopped when a first match occurs, but this is not necessarily so.

Figure 2:
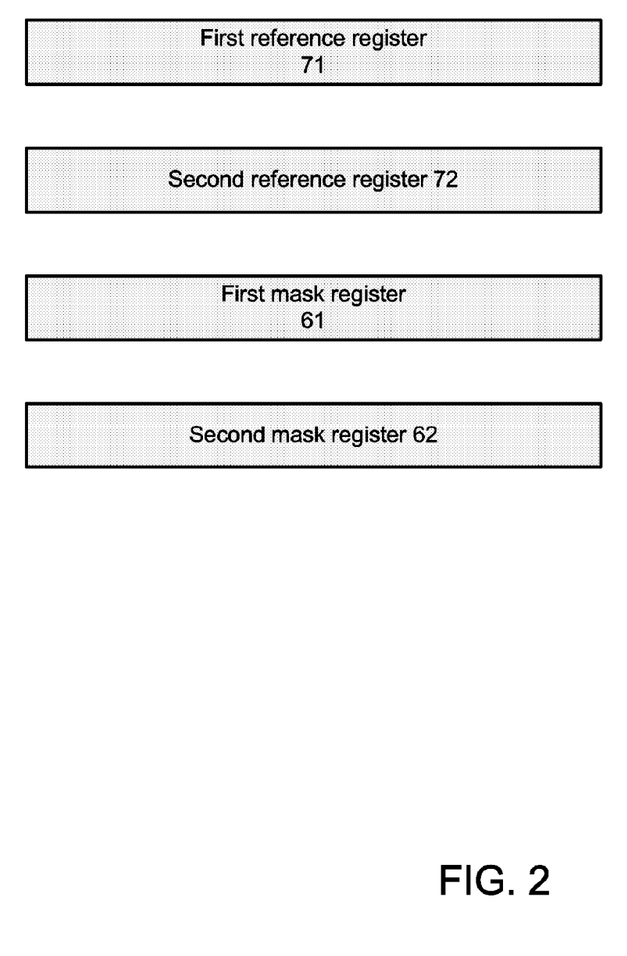
FIG. 2 illustrates some registers that belong to a register file according to an embodiment of the invention.

FIG. 2 illustrates two mask registers 61 and 62, and two (data) reference registers 71 and 72, according to an embodiment of the invention.

It is noted that these registers can belong to processor 30, can belong to the hardware accelerator 100 or can be shared by processor 30 and hardware accelerator 100.

Initially, the first mask register 61 stores the upper portion of a mask while the second mask register 62 can store a lower portion of a mask. Conveniently, a mask can be stored in additional registers or within a single register, depending upon the size of each register and the length of the mask. The inventors used a sixty-four bit mask and thirty-two bit registers.

The first reference register 71 stores the upper portion of a predefined value while the second reference register 72 stores the lower portion of the predefined value. It is noted that the predefined value can be stored in one register only, in a portion of a register or in more than two reference registers. The inventors used two registers of thirty-two bits each. The size of the reference value was one byte, one half word, a word or a long word (eight bytes).

FIG. 3 illustrates a hardware accelerator 100, according to an embodiment of the invention.

Hardware processor 100 includes a decoder 120 that decodes instructions such as BCAM instruction 200, BCAMI instruction 220 and/or other controls signals provided by processor 30.

Hardware accelerator 100 and especially decision unit 140 are adapted to send a search result to the processor 30. The search result can include the address of a matching data chunk, an offset between the start of the data block and the matching data chunk, a match/no-match indication and the like.

Hardware accelerator 100 further includes a DMA controller 104, a reference data generator 105, a fetched data unit storage 108, mask generation unit 130, eight byte match units 111-118 and a decision unit 140.

The decoder 120 is connected to the DMA controller 104, to the reference data generator 105, to the mask generator unit and to the decision unit 140 for sending control signals to these components.

The DMA controller 104 fetches one data unit at a time and provides the fetched data unit to the fetched data unit storage 108. If there is a need to fetch a new data unit the DMA controller 104 fetches a new data unit. The fetching process can end when the whole data block is scanned or when another condition is fulfilled. For example if a matching data chunk is found the process can end.

The number of data unit fetch operations does not exceed the number of data chunks in a data block. The timing of the fetch operation should be synchronized or otherwise responsive to the completion of a data unit processing stage or to a provision of a current data unit to byte matching units 111-118.

The DMA controller 104 can receive timing signals from decision unit 140 such as data unit completion indication that is also provided to the mask generator unit 130.

The DMA controller 104 can compare between the size of the data units it fetches, the size of the data block and the number of data unit fetch operation it executed and in response determine which data chunks belong to a fetched data unit but do not belong to the data block. This can occur when the size of the data block is not equal to a product of a positive integer and the size of the data unit. The DMA controller 104 can send validity indication that indicate whether to ignore a certain match indication or not.

It is assumed that the hardware accelerator 100 is able to process one data unit of eight bytes at a time. This is not necessarily so.

The hardware accelerator 100 includes a reference data generator 105 for generating reference data. The reference data generator 105 can retrieve reference data from registers 71 and 72 and duplicate portions of the content of these one or two registers in response to the size of the data chunk. Thus, if the data chunk is one byte then one of the bytes of registers 71 and 72 can be duplicated eight times to provide eight reference data bytes.

According to an embodiment of the invention the hardware accelerator 100 includes multiple match units, such as byte match units 111-118. It is noted that match units of different sizes can be used.

Each byte match unit includes: (i) two data inputs for receiving a data byte (provided by fetched data unit storage 108) and a reference data byte (provided by reference data generator 105), (ii) bit mask input, for receiving a bit level mask, (iii) data chunk mask input, for receiving a data chunk level bit, (iv) data chunk enable input, for receiving an indication if the data byte belongs to the data block, and (v) an output for providing a match indication.

The eight byte match units 111-118 output eight match indications denoted MATCH1-MATCH8 121-128. Conveniently, the k'th byte match unit (k ranges between 1 and 8) receives the k'th data byte and the k'th reference byte, and output the k'th match indication. The first till eighth byte match units 111-118 receive data bytes B1-B8 and reference data bytes RB1-RB8 respectively.

The match indications, as well as a data chunk size indication and validity information are provided to the decision unit 140. The decision unit 40 outputs the location (if a match occurred) of the data chunk that has a predefined value.

The data chunk size may be one or multiple bytes. Accordingly, the decision unit 140 decides if the received match indication reflect that a matching data chunk was found, reflect that only a portion of the data chunk matched or that there is no match at all. In both the second and third cases a no-match indication is provided by the decision unit 140.

In addition, assuming that there is a match data chunk, its address is also responsive to the size of the matching data chunk. The location can be selected as the location of the first matching byte out of the multiple matching bytes that form the matching data chunk.

The decoder 120 receives a BCAM instruction 200, a BCAMI instruction 220 or other representations of these instructions (also referred to as control signals) from processor 30 and in response controls the operation of the hardware accelerator 100.

The mask generator 130 includes a data chunk mask generator 132 and a bit mask generator 134. The mask generator 130 receives a bit level mask/data chunk level mask indication from the decoder 120, a data unit completion indication from the decision unit 140, and can also receive the content of two mask registers 61 and 62.

In response to these signals, the mask generator 130 outputs a bit level mask and a data chunk level mask. According to an embodiment of the invention only one mask is valid at a given time. The other mask is assigned with a default value that does not affect the match operation. If, for example, the mask is applied by performing AND operations then a default value that includes only '1' can be provided.

Figure 4:
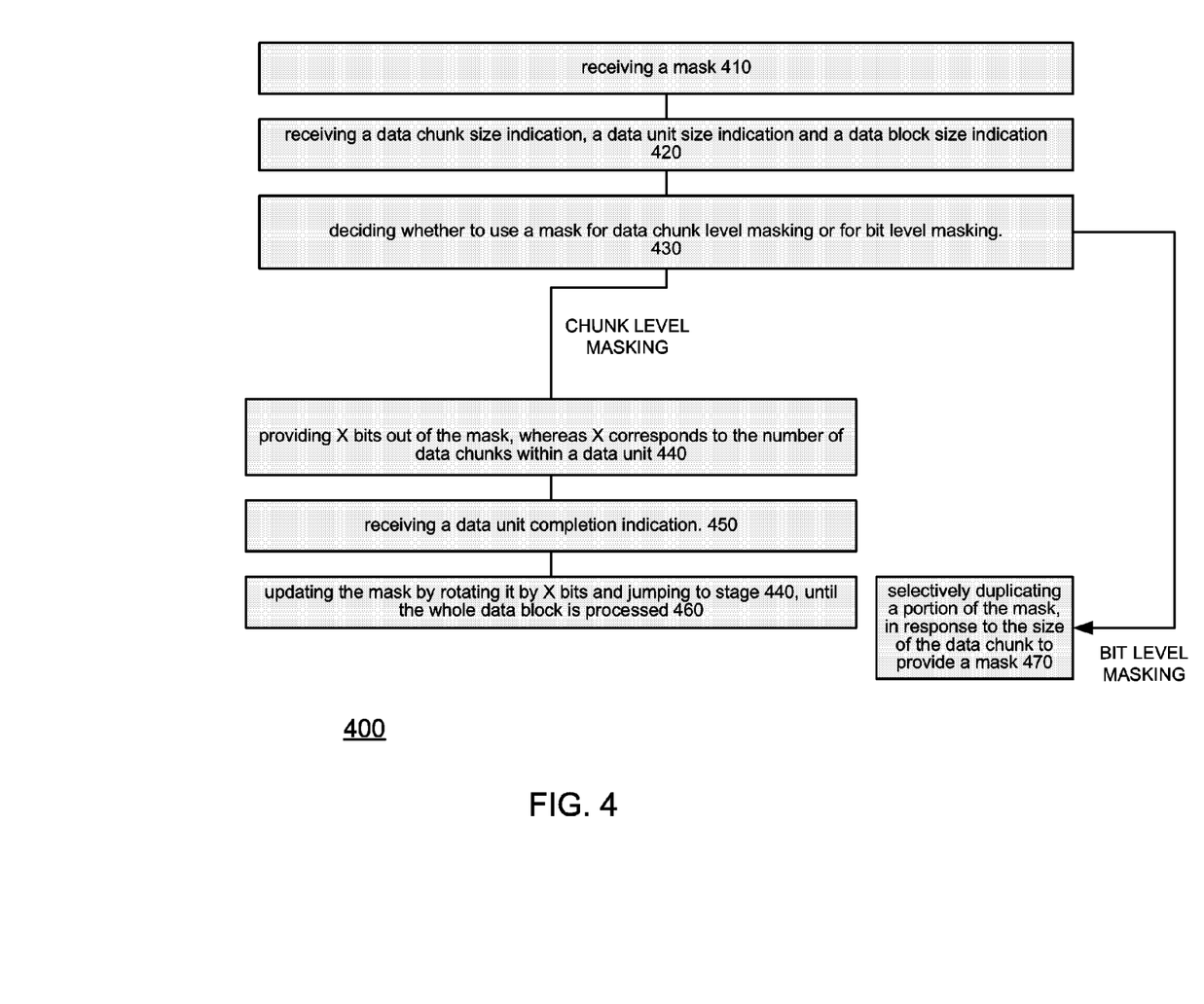
FIG. 4 illustrates a mask generation method, according to an embodiment of the invention.

FIG. 4 illustrates a mask generation method 400, according to an embodiment of the invention.

Method 400 starts by stage 410 of receiving a mask. The mask can be stored at the first and second mask registers 61 and 62.

Stage 410 is followed by stage 420 of receiving a data chunk size indication, a data unit size indication and a data block size indication.

Stage 420 is followed by stage 430 of deciding whether to use a mask for data chunk level masking or for bit level masking. The decision can be responsive to a bit level mask/ data chunk level mask indication.

If method 400 decides to use a mask for data-chunk level masking then stage 430 is followed by stage 440 of providing X bits out of the mask, whereas X corresponds to the number of data chunks within a data unit. During the first iteration of stage 440 the first X bits of the mask can be provided.

Stage 440 is followed by stage 450 of receiving a data unit completion indication.

Stage 450 is followed by stage 460 of updating the mask by rotating it by X bits and jumping to stage 440, until the whole data block is processed. It is noted that the matching process can end before the whole data block is scanned. In such a case stage 440 can be followed by an idle stage (not shown).

Conveniently, stage 440 also includes providing a default bit level mask that does not perform bit level masking operations.

If method 400 decides to use a mask for bit level masking then stage 430 is followed by stage 470 of selectively duplicating a portion of the mask, in response to the size of the data chunk to provide a mask. Thus, if a data chunk is one byte long then eight bits of the mask are duplicated to provide the mask. If, for example, the data chunk is a half word and the mask is sixty-four bits long then the content of the first mask register 61 (or the second mask register 62) can be duplicated twice.

Conveniently, stage 440 also includes providing a default data chunk level mask that does not perform bit level masking operations.

The duplications and rotations were based upon the assumption that data chunks have fewer bits than the mask and that the data block has more bytes than the size of the mask. Accordingly, the bit level mask can be duplicated while the data chunk level mask is rotated. Those of skill in the art will appreciate that rotating and duplication operation can be applied on either mask.

Figure 5:
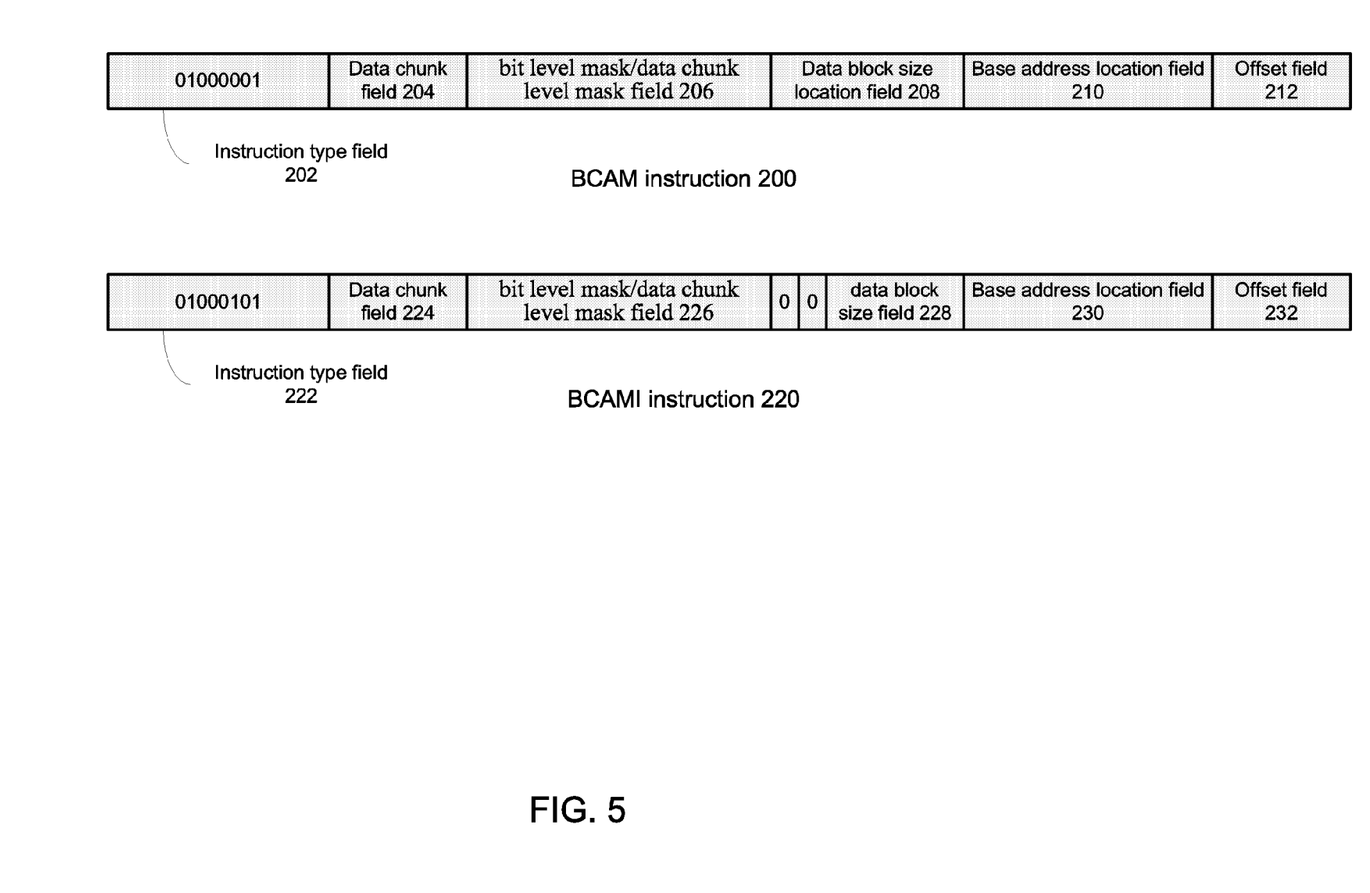
FIG. 5 illustrates a BCAM instruction and a BCAMI instruction, according to various embodiments of the invention.

FIG. 5 illustrates a BCAM instruction 200 and a BCAMI instruction 220, according to various embodiments of the invention.

BCAM instruction 200 includes an instruction type field 202, a data chunk size field 204, a bit level mask/data chunk level mask field 206, a data unit size location field 208, a base address location field 210, an offset value field 212.

The instruction type field 202 includes a code that indicates that instruction 200 is a search within a data block for a data chunk having a predefined value instruction in which the size of the data block should be fetched from a certain location. The inventors used the following code '01000001' but other codes can be used.

Data chunk size field 204 indicates the size of the data chunk. For example values of zero, one and two indicate a byte sized data chunk, a half word sized data chunk and a word sized data chunk. It is noted that larger sizes can be indicated by using more bits.

The bit level mask/data chunk level mask field (also referred to as bit/chunk field) 206 indicated whether to use a mask for bit level masking or for data chunk level masking.

The data unit size location field 208 indicates a register (RA) that stores the size of data unit. It can also point to an entry within a memory unit.

The base address location field 210 and the offset value field 212 indicate where the data block starts. Typically, the base address location field 210 points to a location of the base address. The base address can be stored in a register but this is not necessarily so. The offset value field 210 stores the actual offset. This is not necessarily so. The offset can be positive or negative.

BCAMI instruction 220 includes an instruction type field 222, a data chunk size field 224, a bit level mask/data chunk level mask field 226, a data unit size field 228, a base address location field 230, and an offset value field 232.

The instruction type field 222, data chunk size field 224, a bit level mask/data chunk level mask field 226, base address location field 230, offset value field 232 and the irrelevant bits 226 are analogues to instruction type field 202, data chunk size field 204, a bit level mask/data chunk level mask field 206, base address location field 210, and offset value field 212.

The instruction type field 222 includes a code that indicates that instruction 220 is a search within a data block for a data chunk having a predefined value instruction in which the size of the data block is immediate coded. The inventors used the following code '01000101' but other codes can be used.

The data unit size field 228 either represents the data block field or can indicate an offset from a value stored in predefined control registers. The inventors used various codes to indicate the size of the data block and different codes to indicate an offset from a value stored in predefined control registers. For example, values 2-7 indicate a data block size of 4-64 bytes. A value of zero indicated an offset of one byte from a value of six bits of a first control register. A value of one indicated an offset of one byte from a value of six bits of a second control register.

One Assembler syntax of BCAM 200 is BCAM {.dsize, .mask} RA, RB. Another assembler syntax of BCAM 200 is BCAM{.dsize, .mask} RA, {-}disp(RB).

One Assembler syntax of BCAMI 220 is BCAMI {.dsize, .mask .buffer_size}, RB. Another assembler syntax of BCAM 200 is BCAM{.dsize, .mask .buffer_size}, {-}disp (RB).

Referring to the BCAM instruction 200. It refers to a first register that is pointed by RA and stores the size of the data block. A second register RB stores the base address of the data block. The "{-}disp(RB)" expression indicates that the offset should be calculated by adding or reducing the offset field from the base address stored in RB.

The size of the data chunk is indicated by .dsize, while the bit level masking/data chunk level masking is indicated by .mask. Data chunk sizes of one byte, one half word, word and long word (eight bytes) were represented by the following values of .dsize: 0, 1, 2 and 3.

Referring to the BCAMI instruction 220. It does not include RA but rather includes a .buffer_size. The buffer_size indicates what is the size of the data block. It is noted that the data block can be stored in one or more buffers, in a portion of a buffer as well as in other storage components that differ from a buffer. Data blocks that include 4, 8, 16, 32, 48 and 64 bytes were indicated by values of 2-7. It is noted that different mappings between the value of buffer_size and the size of the data block can be applied.

The size of a data block could have been calculated in response to the value of one or more bits in a predefined location. The inventors used two control registers to store possible size of the data blocks. Unique values of buffer_size indicate that a control register should be read in order to determine the size of the data block.

Figure 6:
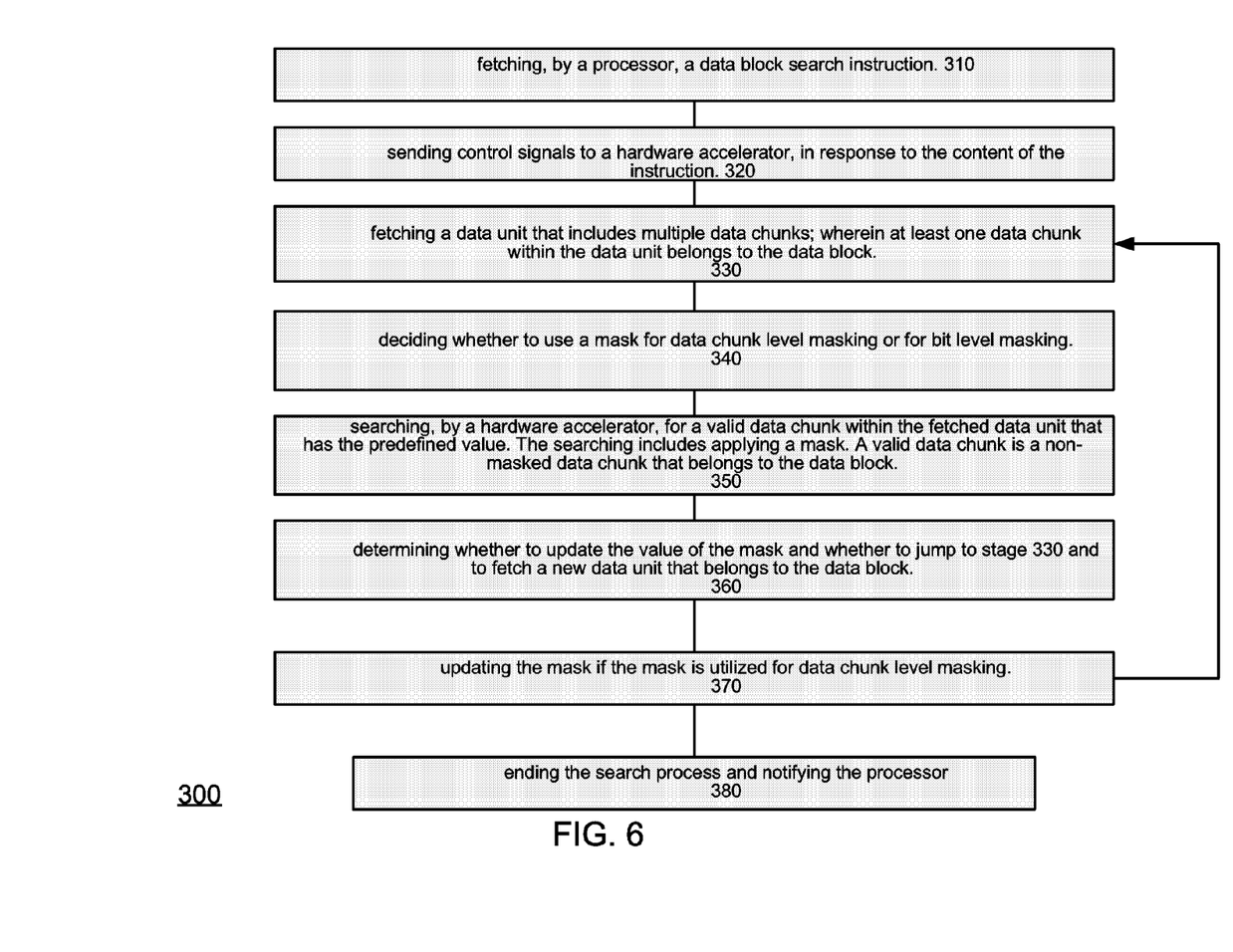
FIG. 6 illustrates a method for searching within a data block for a data chunk having a predefined value, according to an embodiment of the invention.

FIG. 6 illustrates method 300 for finding a predefined value data unit, according to an embodiment of the invention.

Method 300 starts by stage 310 of fetching, by a processor, a data block search instruction.

Conveniently, the fetching includes fetching an instruction that includes a data unit size value. Conveniently, the fetching includes fetching an instruction that comprises a data unit size location field.

Stage 310 is followed by sending control signals to a hardware accelerator, in response to the content of the instruction. Conveniently, the processor requests the hardware accelerator to execute a search operation and can (the processor) continue to execute other instructions, especially instructions that do not need to wait till the search operation is completed.

Stage 320 is followed by stage 330 of fetching a data unit that includes multiple data chunks; wherein at least one data chunk within the data unit belongs to the data block.

Stage 330 is followed by stage 340 of deciding whether to use a mask for data chunk level masking or for bit level masking.

Stage 340 is followed by stage 350 of searching, by a hardware accelerator, for a valid data chunk within the fetched data unit that has the predefined value. The searching includes applying a mask. A valid data chunk is a non-masked data chunk that belongs to the data block.

Conveniently, the searching includes performing in parallel multiple match operations between multiple data chunks that belong to the data unit and multiple reference data chunks.

Conveniently, the searching includes duplicating a mask portion having a size that is responsive to a size of the data chunk, such as to provide a mask, if the mask is utilized for bit level masking.

Stage 350 is followed by stage 360 of determining whether to update the value of the mask and whether to jump to stage 330 and to fetch a new data unit that belongs to the data block. In response to the determination the method 300 can end and provide a search result or continue to stage 370 of updating the mask if the mask is utilized for data chunk level masking.

Conveniently, stage 370 includes updating the mask in response to a size of the data chunk. Conveniently, stage 370 includes rotating the mask by a data unit size.

According to another embodiment of the invention the mask is a bit level mask and stage 370 can also include duplicating a portion of the mask in order to provide a bit level mask.

When the search ends the process continues to stage 380 of sending an indication to the processor.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

We claim:

1. A method for searching within a data block for a data chunk having a predefined value, the method comprises:
    fetching, by a processor, a data block search instruction;
    fetching a data unit that comprises multiple data chunks, wherein at least one data chunk within the data unit belongs to the data block;
    deciding whether to use a mask for data chunk level masking or for bit level masking;
    searching, by a hardware accelerator, for a valid data chunk within the fetched data unit that has the predefined value, wherein the searching comprising applying a mask; wherein a valid data chunk is a non-masked data chunk that belongs to the data block; and
    determining whether to update the value of the mask and whether to fetch a new data unit that belongs to the data block.

2. The method according to claim 1 wherein the searching comprises duplicating a mask portion, the mask portion having a size determined based on a size of the data chunk, such as to provide a mask, if the mask is utilized for bit level masking.

3. The method according to claim 2 wherein the fetching, by a processor, comprises fetching an instruction that comprises a data unit size value.

4. The method according to claim 2 wherein the fetching, by a processor, comprises fetching an instruction that comprises a data unit size location field.

5. The method according to claim 2 further comprising updating the mask if the mask is utilized for data chunk level masking.

6. The method according to claim 5 wherein a size of the mask is determined based on a size of the data chunk.

7. The method according to claim 5 wherein the updating comprises rotating the mask by a data chunk size.

8. The method according to claim 2 wherein the searching comprises performing in parallel multiple match operations between multiple data chunks that belong to the data unit and multiple reference data chunks.

9. The method according to claim 1 wherein the searching comprises performing in parallel multiple match operations between multiple data chunks that belong to the data unit and multiple reference data chunks.

10. The method according to claim 1 wherein the searching comprises duplicating a mask portion, the mask portion having a size determined based on a size of the data chunk, such as to provide a mask, if the mask is utilized for bit level masking.

11. The method according to claim 1 wherein the fetching, by a processor, comprises fetching an instruction that comprises a data unit size value.

12. The method according to claim 1 wherein the fetching, by a processor, comprises fetching an instruction that comprises a data unit size location field.

13. A device for locating a predefined value data chunk within a data block, the device comprises:
   a memory unit adapted to store data units and a processor adapted to fetch an instruction and selectively generate control signals in response to the fetched instruction; and
   a hardware accelerator, coupled to the memory unit, wherein the hardware accelerator is adapted to:
      (i) receive control signals from the processor,
      (ii) fetch a data unit that comprises multiple data chunks, wherein at least one data chunk within the data unit belongs to the data block,
      (iii) decide whether to use a mask for data chunk level masking or for bit level masking;
      (iv) search for a valid data chunk within the fetched data unit that has the predefined value, wherein the searching comprising applying a mask, wherein a valid data chunk is a non-masked data chunk that belongs to the data block; and
      (v) determine whether to update the value of the mask and whether to fetch a new data unit that belongs to the data block.

14. The device according to claim 13 wherein the hardware accelerator is adapted to duplicate a mask portion having a size that is responsive to a size of the data chunk, such as to provide a mask, if the mask is utilized for bit level masking.

15. The device according to claim 14 wherein the processor is adapted to fetch an instruction that comprises a data unit size value.

16. The device according to claim 14 wherein the processor is adapted to fetch an instruction that comprises a data unit size location field.

17. The device according to claim 14 wherein the hardware accelerator is adapted to update the mask if the mask is utilized for data chunk level masking.

18. The device according to claim 14 wherein the hardware accelerator is adapted to update the mask in response to a size of the data chunk.

19. The device according to claim 14 wherein the hardware accelerator is adapted to rotate the mask by a data chunk size.

20. The device according to claim 14 wherein the hardware accelerator is adapted to perform in parallel multiple match operations between multiple data chunks that belong to the data unit and multiple reference data chunks.

\* \* \* \* \*

UNITED STATES PATENT AND TRADEMARK OFFICE
CERTIFICATE OF CORRECTION

PATENT NO. : 8,117,383 B2
APPLICATION NO. : 12/161519
DATED : February 14, 2012
INVENTOR(S) : Moti Dvir et al.

Page 1 of 1

It is certified that error appears in the above-identified patent and that said Letters Patent is hereby corrected as shown below:

At Column 9, Line 11, Claim 10, please change "claim 1," to --claim 9,--

Signed and Sealed this
Twenty-fifth Day of September, 2012

David J. Kappos
*Director of the United States Patent and Trademark Office*